United States Patent
Meyer (10) Patent No.: US 12,434,451 B2
(45) Date of Patent: Oct. 7, 2025

(54) SLIDER ARRANGEMENT

(71) Applicant: FIBRO GmbH, Weinsberg (DE)

(72) Inventor: Markus Meyer, Wangen im Allgaeu (DE)

(73) Assignee: FIBRO GmbH, Weinsberg (DE)

( * ) Notice: Subject to any disclaimer, the term of this patent is extended or adjusted under 35 U.S.C. 154(b) by 268 days.

(21) Appl. No.: 18/121,865

(22) Filed: Mar. 15, 2023

(65) Prior Publication Data

US 2023/0294375 A1    Sep. 21, 2023

(30) Foreign Application Priority Data

Mar. 21, 2022 (DE) ...................... 10 2022 106 585.5

(51) Int. Cl.
  *B30B 1/40*   (2006.01)
  *B21D 28/32*   (2006.01)
  *B30B 15/14*   (2006.01)

(52) U.S. Cl.
  CPC .............. *B30B 1/40* (2013.01); *B21D 28/325* (2013.01); *B30B 15/14* (2013.01)

(58) Field of Classification Search
  CPC ......... B30B 1/40; B30B 15/14; B30B 15/041; B30B 15/068; B21D 19/084; B21D 28/32; B21D 28/325; B21D 37/12; B21D 37/04; B21D 37/02; B23Q 5/027
  See application file for complete search history.

(56) References Cited

U.S. PATENT DOCUMENTS

| | | | |
|---|---|---|---|
| 5,101,765 A * | 4/1992 | Manfrin | A01K 39/0125 119/53 |
| 5,884,521 A | 3/1999 | Fidziukiewicz | |
| 5,904,064 A | 5/1999 | Higuchi | |
| 5,931,074 A | 8/1999 | Matsuoka | |
| 6,986,296 B2 | 1/2006 | Miyaji et al. | |

FOREIGN PATENT DOCUMENTS

| | | |
|---|---|---|
| DE | 19753549 A1 | 6/1999 |
| DE | 699 06 746 T2 | 4/2004 |
| DE | 10 2012 014 546 A1 | 1/2014 |

(Continued)

OTHER PUBLICATIONS

Machine translation of EP-1098094 A1—5 pages, retrieved in 2025 (Year: 2025).*

(Continued)

*Primary Examiner* — Jimmy T Nguyen
(74) *Attorney, Agent, or Firm* — Dickinson Wright PLLC (57) ABSTRACT

A slider arrangement (1) has a wedge drive tool with a slider upper portion (10) and a slider lower portion (20) which, due to a relative movement with respect to the slider upper portion (10), can be displaced along guides (30) from an initial position into a working position and vice versa. At least one return device (40) is provided in order to bring about the initial position of the slider upper portion (10) and slider lower portion (20), wherein the return device (40) has a screw plug (50) at the end in order to attach the return device (40) in a recess (11) of the slider arrangement (1). The screw plug (50) can have one or at least two rotation prevention part(s) (51) designed to prevent a rotation of the screw plug (50) beyond a maximum acceptable rotation angle $\alpha$.

11 Claims, 7 Drawing Sheets

(56) References Cited

FOREIGN PATENT DOCUMENTS

| | | | |
|---|---|---|---|
| EP | 1097010 A1 | 5/2001 | |
| EP | 1098094 A1 * | 5/2001 | .............. F16B 39/10 |
| EP | 1764168 A1 | 3/2007 | |
| JP | 2004236767 A * | 8/2004 | ......... A61B 17/8615 |
| WO | 00/02680 A1 | 1/2000 | |

OTHER PUBLICATIONS

Machine translation of JP-2004236767 A—9 pages, retrieved in 2025 (Year: 2025).*
Machine translation of DE 102012014546A1—5 pages, retrieved in 2025. (Year: 2025).*
German Examination Report dated Dec. 6, 2022, which issued in the corresponding German Patent Application No. 10 2022 106 585.5.
European Search Report dated Aug. 1, 2023, which issued in the corresponding European Patent Application No. 23155613.5.

* cited by examiner

SLIDER ARRANGEMENT

CROSS REFERENCE TO RELATED APPLICATION

This application claims the benefit of priority under 35 U.S.C. § 119 to German Patent Application No.: 10 2022 106 585.5, filed Mar. 21, 2022, the contents of which are incorporated herein by reference in their entirety.

BACKGROUND

(1) Field

The invention relates to a slider arrangement.

(2) Description of Related Art

The statements in this section merely provide background information related to the present disclosure and several definitions for terms used in the present disclosure and may not constitute prior art. Various slider arrangements are known. In particular, slider arrangements are known which comprise a slider, a slider support supporting the slider in sliding connection, and at least one driver, wherein the slider, due to a relative movement between the slider support and the driver, can be displaced, in contact with the driver, along the guides of the slider support and of the driver, from an initial position into a working position and vice versa.

As spring element for moving the slider into the initial position, for example, a gas pressure spring is used.

Slider arrangements of the generic type are known in practice. The generic slider arrangements are used for force transmission with respect to a tool, for example, for stamping, cutting, forming, splitting, etc. The pressure necessary for machining is regularly applied via a press which acts with interposition of the slider arrangement with respect to a base or a machine frame. The direction of movement of a press stamp is transformed by the highly specific slider arrangement into a direction of movement of the slider, which regularly extends at an acute angle with respect to a slider support.

In a known slider arrangement, the slider support is exposed via a press to a force which acts between the slider support and a driver braced on a base or a base frame. By unloading and return of the slider support, the slider is pulled back from the working position into the initial position, and namely also again along the guides of the driver and the slider support.

In the known slider arrangement, it is disadvantageous that, during operation, disturbances or problems can occur when the attachment of the gas pressure spring is not permanently ensured. Any screw plug present can accidentally become unscrewed, for example, during operation due to shocks and vibrations. On the other hand, known solutions for preventing this problem cannot be transferred directly to a slider arrangement (wedge slider or wedge drive mechanism), since, on the one hand, the mounting, and, on the other hand, the operational safety and also any disassembly and reassembly for maintenance purposes must be ensured.

SUMMARY

Example embodiments of the present invention provide a solution for an improved slider arrangement that overcomes at least the aforementioned technical problems with known slider arrangements and yet does not involve a permanent state to be established once, but rather a state which, after each maintenance operation and also after the first installation, can be reliably and reproducibly established and at the same time implemented in a cost-effective manner. In particular, example embodiments of the present invention provide a solution which can be used in the case of already existing slider solutions, without the sliders having to be modified in a cost-intensive manner.

Example embodiments of the present invention provide a technical solution to the underlying problem of the invention that is remedying the disadvantages known from the prior art and providing an improved, cost-effectively implementable solution for a slider arrangement.

In accordance with example embodiments, a slider arrangement is provided that is designed in particular as a wedge drive tool with a slider upper portion and a slider lower portion which, due to a relative movement with respect to the slider upper portion, can be displaced along guides from an initial position into a working position and vice versa, wherein at least one return device is provided in order to bring about the initial position of the slider upper portion and slider lower portion, wherein the return device comprises a screw plug at the end in order to attach the return device in a recess of the slider arrangement, wherein the screw plug comprises at least two (preferably several) rotation prevention means which are designed to prevent a rotation of the screw plug beyond a maximum acceptable rotation angle $\alpha$.

It is particularly preferable if the return device is a gas pressure spring mounted in the slider arrangement.

Moreover, it can advantageously be provided that, on the slider arrangement, at least two mounting positions M1, M2 for each identical and detachable attachment means are provided, wherein, during the mounting, one of the attachment means of at least one of the rotation prevention means protruding on the screw plug prevents the rotation of the screw plug beyond a maximum acceptable rotation angle $\alpha$.

Alternatively or additionally, a screw plug can comprise multiple rotation prevention means arranged on the circumference of the screw head, preferably arranged at an equidistant spacing when viewed in circumferential direction. Thus, for example, 5 identical rotation prevention means can protrude evenly distributed over the circumference.

Another advantageous development of the slider arrangement provides that the screw plug head of the screw plug is not round when viewed in cross section and forms a wavy outer contour. The wavy outer contour can be formed by milling a round starting contour, whereby "valleys" and "peaks" along the circumference are generated.

In particular, for this purpose, it can be provided that the multiple rotation prevention means here extend radially outward transversely with respect to the screw axis and thus transversely away from the screw head.

The rotation prevention means can in particular be provided in the form of peaks, projections, protrusions or bosses on the screw head.

Also advantageous is an embodiment wherein the two mounting positions M1, M2 for an attachment means are positioned or provided on the slider arrangement so that only one attachment means in each case can be mounted in only one of the two mounting positions, and, in particular, a mounting of the attachment means in the respective other position is prevented by the position of one of the rotation prevention means. This is preferably achieved in that the rotation prevention means in question protrudes into the mounting space for the attachment means in this position and thus blocks a mounting.

Advantageously, the rotation prevention means can be implemented in that the attachment means has such a form or a protruding projection, by means of which the attachment means extends into the region within the envelope contour of the screw head, preferably into a region of the envelope curve or envelope contour, which lies between two rotation prevention means. Here, the attachment means can also be designed in the form of two parts; a single-part and single-piece solution is preferable.

Moreover, it is preferable if the respective mounted attachment means comprises a round cross-sectional form, by means of which the attachment means extends at least partially into the region within the envelope contour of the screw head. In the case of a slight rotation of the screw plug, the attachment means then block the protruding rotation prevention means and an additional rotation of the screw plug is reliably prevented.

In a preferred embodiment of the invention, it can moreover be provided that the screw head of the screw plug and/or of the attachment means internally comprises an engagement contour for a tool, preferably a recess for an Allen wrench.

Other advantageous developments of the invention are characterized in the dependent claims or represented in greater detail below together with the description of the preferred embodiment of the invention in reference to the figures.

Further features will become apparent from the description provided herein. It should be understood that the description and specific examples are intended for purposes of illustration only and are not intended to limit the scope of the present disclosure.

BRIEF DESCRIPTION OF THE DRAWINGS

Example embodiments of the present invention are presented below with reference to the figures in the drawings, in which.

The figures are exemplary diagrams. Identical reference numerals in the figures designate identical functional and/or structural features.

DETAILED DESCRIPTION

The following description is merely exemplary in nature and is in no way intended to limit the present disclosure or its application or uses. It should be understood that throughout the description, corresponding reference numerals indicate like or corresponding parts and features.

Figure 1:
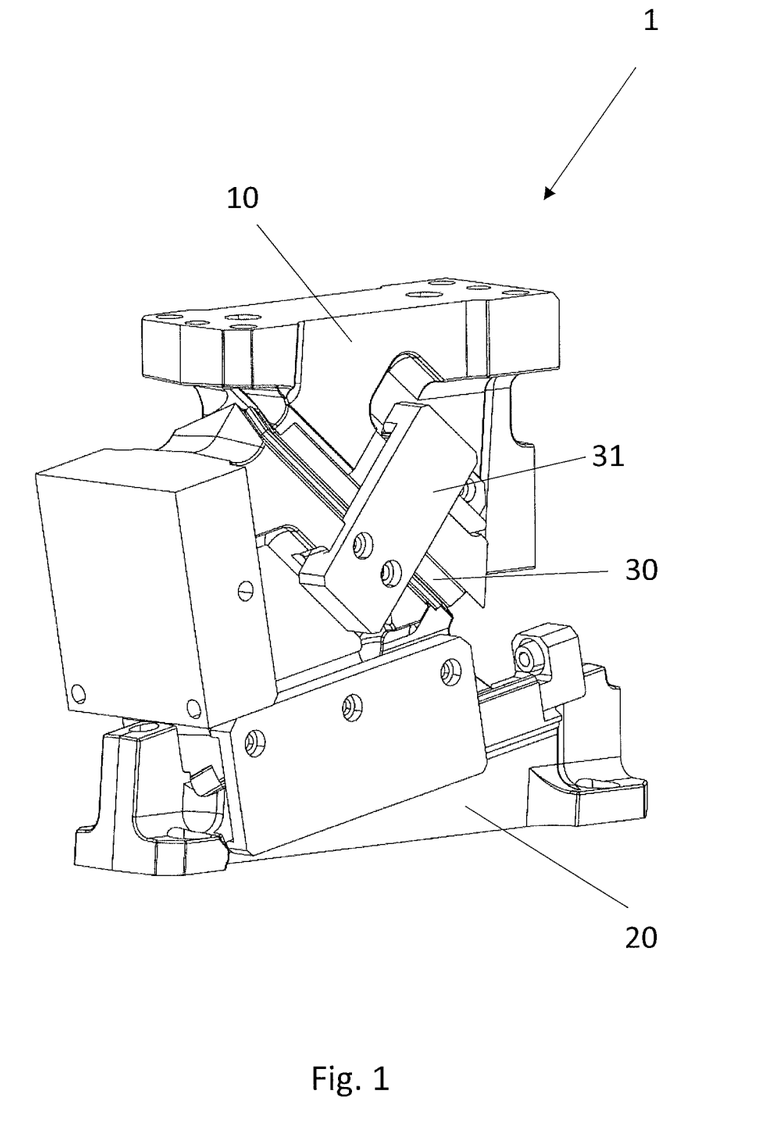
FIG. 1 an isometric view of an exemplary wedge drive tool with a slider upper portion and a slider lower portion.

In FIG. 1, an isometric view of an exemplary wedge drive tool 1, in general a slider arrangement 1, is shown. This slider arrangement 1 has a slider upper portion 10 and a slider lower portion 20 which, due to a relative movement with respect to the slider upper portion 10 can be displaced along guides 30 from an initial position into a working position and vice versa. The bracket 31 holds the components in the guide 30. However, this could also be implemented differently and is not relevant for the present invention.

Figure 2:
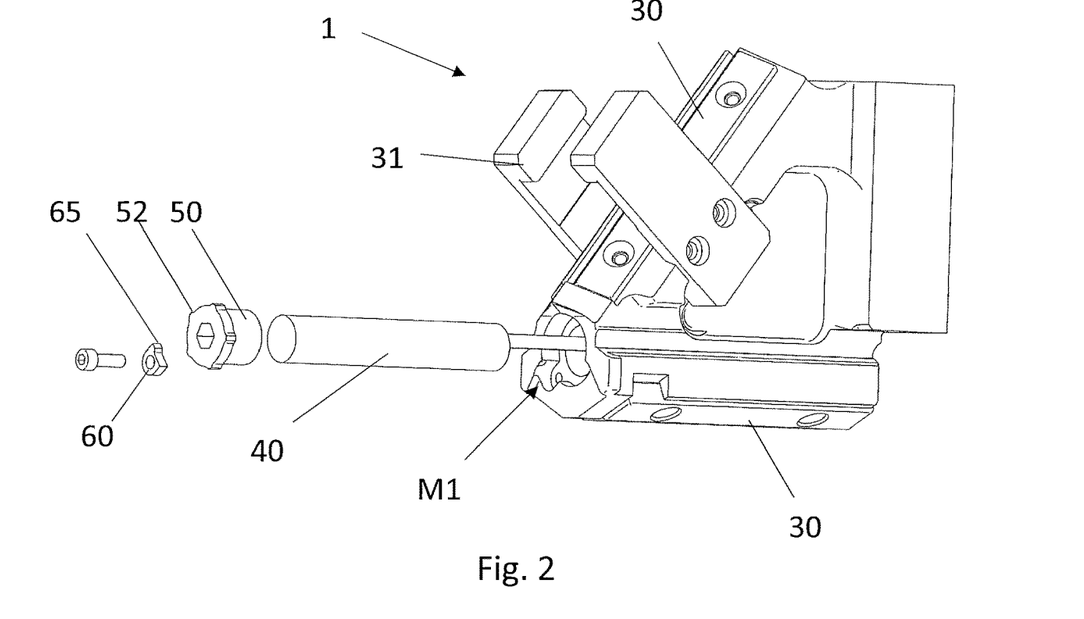
FIG. 2 an isometric view of a portion of the wedge drive tool from FIG. 1.
Figure 7:
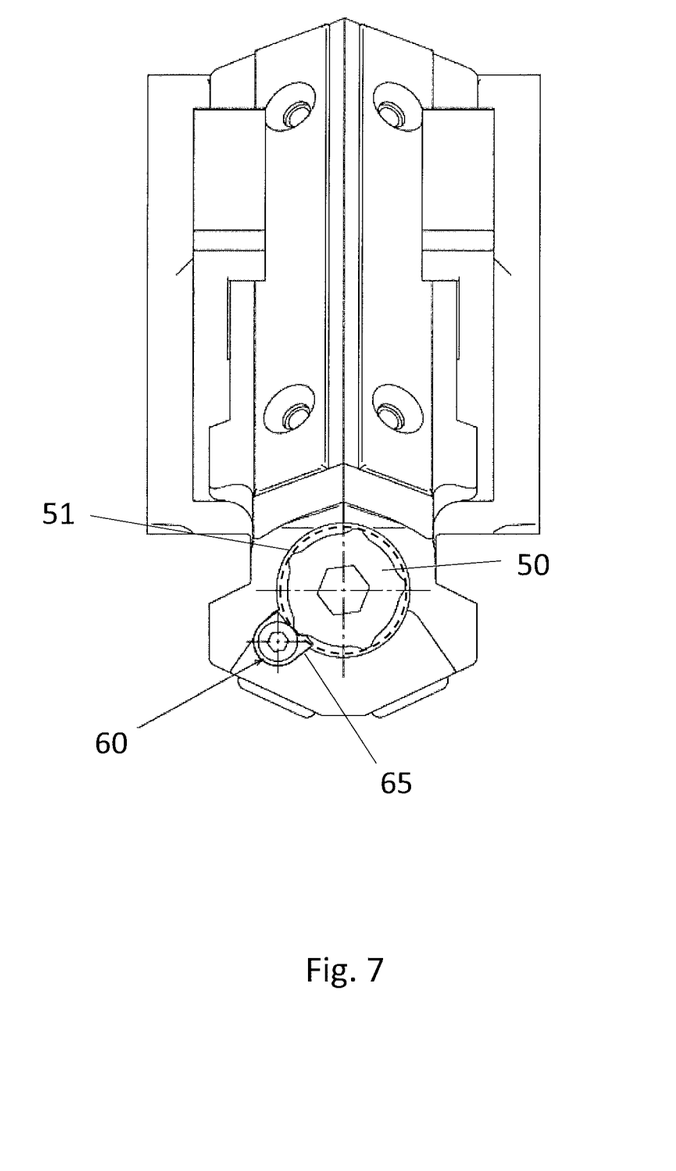
FIG. 7 a view onto an alternative example embodiment of the implementation of a rotation prevention means.
Figure 8:
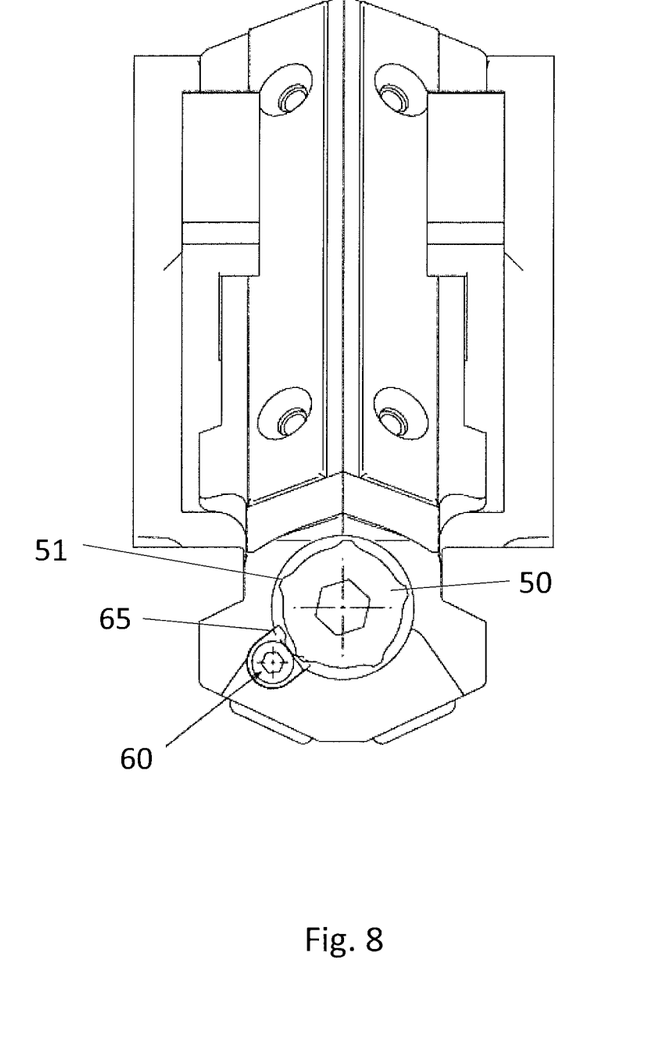
FIG. 8 a view onto the example embodiment example according to FIG. 7 in another rotational position.

In FIG. 2, an isometric view of a portion of the wedge drive tool 1 from FIG. 1 is shown, wherein the return device 40 is shown in a non-mounted position for a better understanding of example embodiments of the invention. In this figure, an attachment means 60 is represented, as is used in the solution according to the example embodiments according to FIGS. 7 and 8. For such an embodiment, only a single mounting position M1 for the attachment means 60 is provided. Depending on the final rotational position in which the screw plug 50 is mounted in its mounting position, the attachment means 60 shown can be mounted only in a certain orientation, in which the projection 65 of the attachment means is positioned either below or above the projection 51 of the screw plug 50. These two mounting positions of the attachment means 60 are shown in FIGS. 7 and 8. And likewise, the corresponding rotational position of the screw plug 50. The protruding projection 65 of the attachment means 60 extends in each case into the region within the envelope contour of the screw head 52, which is represented with dotted lines. During the rotation on the screw plug 50, said screw plug is blocked by the projection 65.

Figure 3:
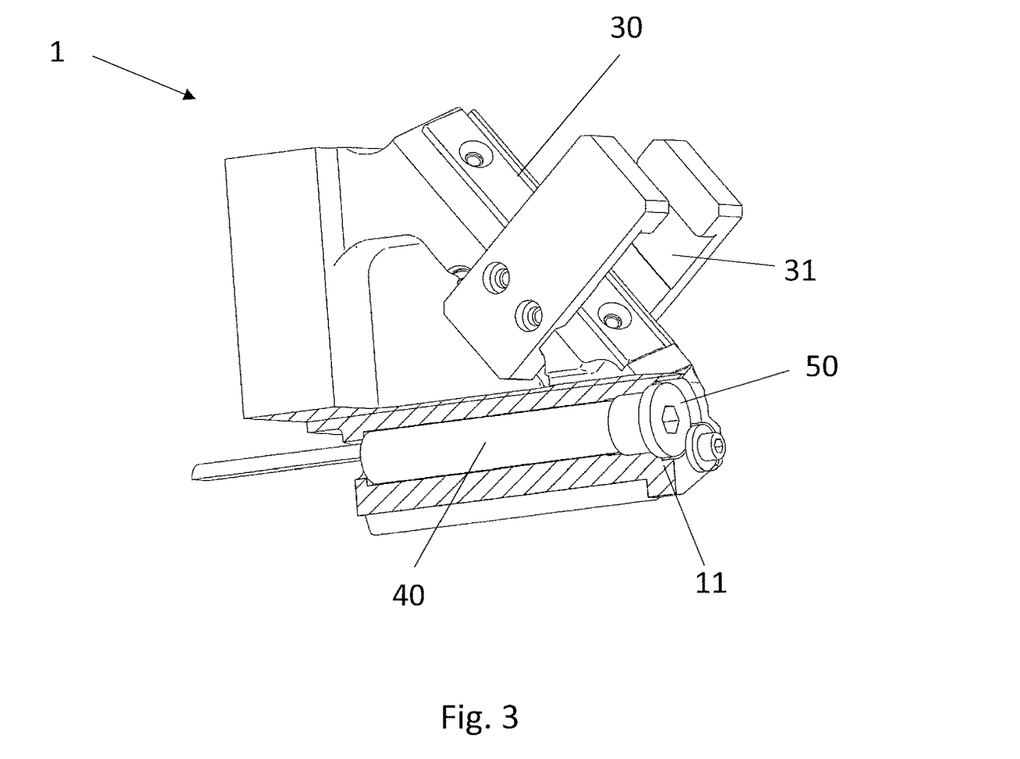
FIG. 3 an isometric view of a portion of a wedge drive tool with a partial cross-sectional view in the region of the return device.

In FIG. 3, an isometric view of the portion of the wedge drive tool 1 according to a conventional solution with a partial cross-sectional view in the region of the return device 40 can be found. The screw plug is secured by a washer against unscrewing. This securing is a not positive locking; the force acts (cyclically) axially on the locking screw.

Figure 4:
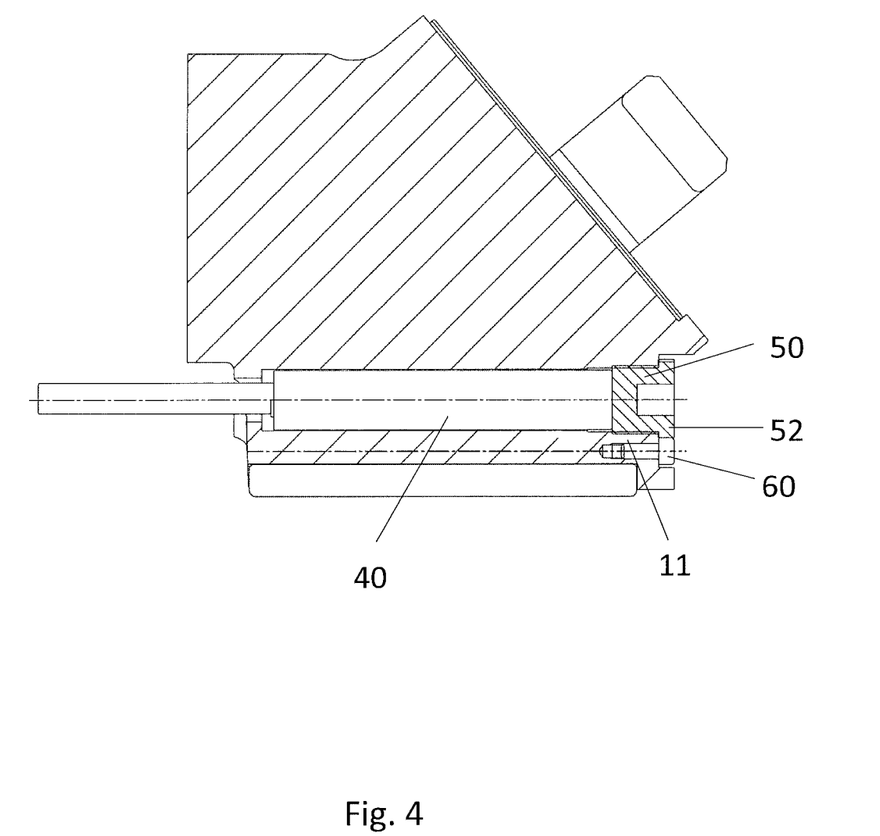
FIG. 4 a cross-sectional view through a wedge driving tool.

The return device 40 is designed to bring about the initial position of the slider upper portion 10 and slider lower portion 20 in the tool. Moreover, it can be seen that the return device 40 comprises said screw plug 50 at the end in order to attach the return device 40 in a recess 11 of the slider arrangement 1, which can be seen more clearly in the view of FIG. 4. In order to limit the rotation angle α of the screw plug 50, said screw plug cooperates with the attachment means 60 which is also shown.

In FIGS. 5 to 8, example embodiments of the implementation of the rotation prevention means are shown. In each case, the front view onto the region with the screw plug 50 can be seen. For this purpose, in the examples shown, the screw plug 50 in each case comprises 5 rotation prevention means 51 in the form of projections extending radially outward, thus transversely with respect to the direction of actuation of the return device 40. Another number of the projections 51 is also conceivable.

Figure 5:
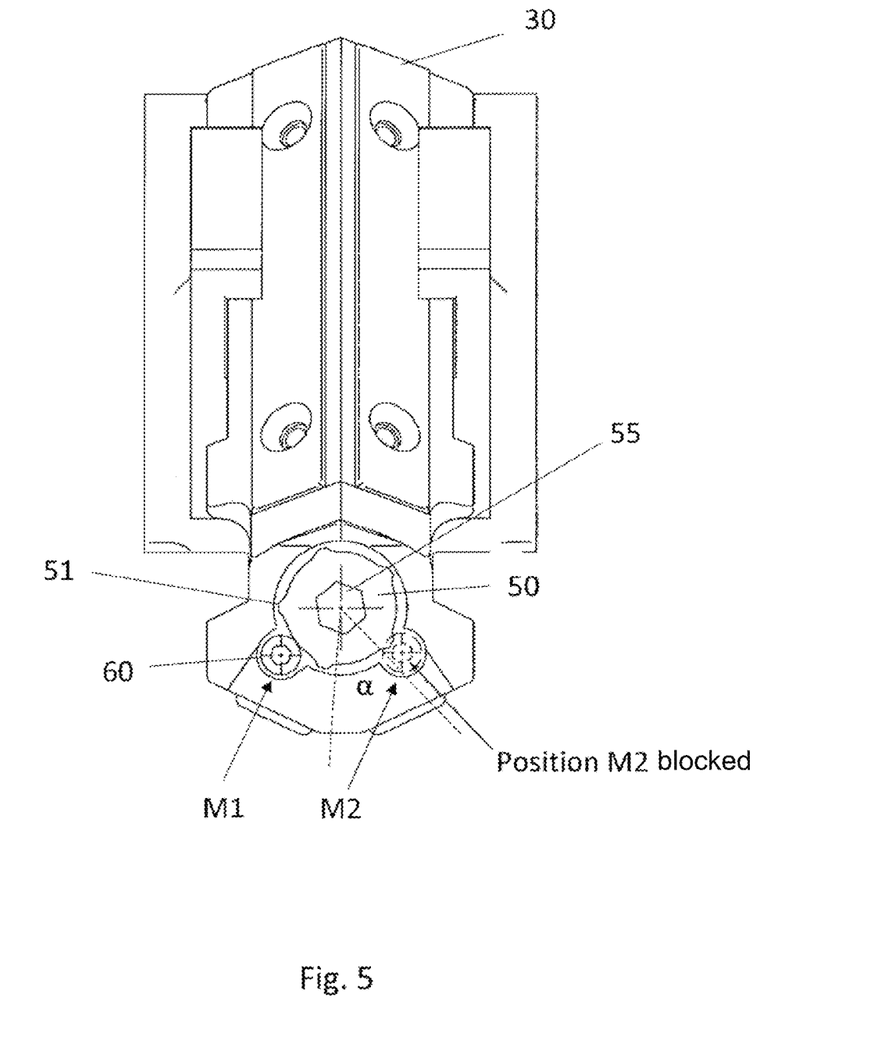
FIG. 5 a view onto a first example embodiment of the implementation of a rotation prevention means FIG. 6 a view onto the example embodiment according to FIG. 5 in another rotational position.
Figure 6:
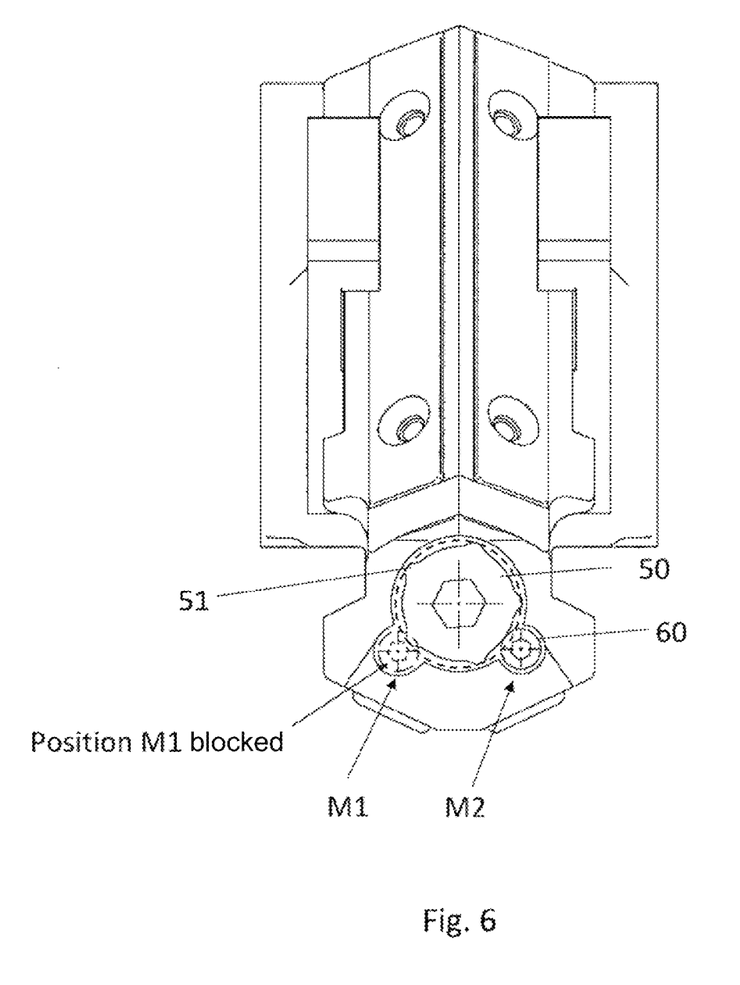

For the mounting of the attachment means 60, in the embodiment according to FIGS. 5 and 6, two alternative mounting positions M1, M2 are provided, wherein, depending on the angular position of the screw plug 50, only a mounting in one of the two mounting positions M1, M2 is possible, while the respective other mounting position is blocked or partially covered by a projection 51 or a protrusion of the rotation prevention means 51. These two mounting possibilities are shown for the example embodiment in FIGS. 5 and 6.

The rotation prevention means 51 shown are provided on the screw head 52. In all the embodiment variants, the rotation of the screw plug 50 beyond a maximum acceptable rotation angle α is prevented (indicated by the two dotted lines in FIG. 5 and the angle α in between). To the extent that the rotation prevention means 51 are arranged at an equidistant spacing when viewed in circumferential direction, the maximum acceptable rotation angle α with respect to the positions of the rotation prevention means 51 is always the same size, wherein, depending on the angular position of the screw plug 50, the actually possible rotation angle can also turn out to be smaller.

The invention claimed is:

1. A slider arrangement (1) designed as a wedge drive tool, the slider arrangement comprising:
    a slider upper portion (10) and a slider lower portion (20) which, due to a relative movement with respect to the slider upper portion (10), can be displaced along guides (30) from an initial position into a working position and vice versa, and
    at least one return device (40) is provided in order to bring about the initial position of the slider upper portion (10) and slider lower portion (20),
    wherein the return device (40) comprises a screw plug (50) at an end thereof in order to attach the return device (40) in a recess (11) of the slider arrangement (1), wherein the screw plug (50) comprises at least two rotation prevention means (51) which are designed to prevent a rotation of the screw plug (50) beyond a maximum acceptable rotation angle (α), by positive locking on an attachment means (60) positioned adjacent to the screw plug (50).

2. The slider arrangement (1) according to claim 1, wherein, on the slider arrangement (1), at least two mounting positions (M1, M2) or mounting variants are provided for respective ones of two of the attachment means (60) that are identical and detachable and wherein, during mounting of one of the two attachment means (60), at least one of the rotation prevention means (51) on the screw plug (50) prevents the rotation of the screw plug (50) beyond a maximum acceptable rotation angle α.

3. The slider arrangement (1) according to claim 1, wherein the at least two rotation prevention means (51) of the screw plug (50) are arranged on the circumference of a screw head (52), and arranged at an equidistant spacing when viewed in a circumferential direction.

4. The slider arrangement (1) according to claim 1, wherein a screw head (52) of the screw plug is not round when viewed in cross section and forms a wavy outer contour.

5. The slider arrangement (1) according to claim 1, wherein the multiple rotation prevention means (51) extend radially outward transversely with respect to a screw axis and thus transversely away from a screw head (52) of the screw plug (50).

6. The slider arrangement (1) according to claim 1, wherein the rotation prevention means (51) are provided as peaks,
    projections, protrusions or bosses on a screw head (52) of the screw plug (50).

7. The slider arrangement (1) according to claim 2, wherein the at least two mounting positions (M1, M2) for the two attachment means (60) are provided on the slider arrangement (1) so that the attachment means (60) in each case can be mounted in only the corresponding one of the two mounting positions (M1, M2) and a mounting of the attachment means (60) is prevented by a position of one of the rotation prevention means (51).

8. The slider arrangement (1) according to claim 1, wherein the attachment means (60) has such a form or a protruding projection (65), by means of which the attachment means (60) extends into a region within an envelope contour of a screw head (52) of the screw plug (50).

9. The slider arrangement (1) according to claim 1, wherein the attachment means (60) has a round cross-sectional form by means of which the attachment means (60) extends at least partially into a region within an envelope contour of a screw head (52) of the screw plug (50).

10. The slider arrangement (1) according to claim 1, wherein a screw head (52) of the screw plug (50) internally has an engagement contour (55) for a tool.

11. The slider arrangement (1) according to claim 10, wherein the engagement contour (55) is chosen from a recess (55) for a hex key, or a recess (55) for a semicircular key.

* * * * *